Sept. 3, 1929.  E. E. TATE  1,726,935

RETAINING DOG FOR COTTON GIN PRESSES

Filed April 9, 1928    2 Sheets-Sheet 1

Inventor

Edgar E. Tate

By *Clarence A. O'Brien*
Attorney

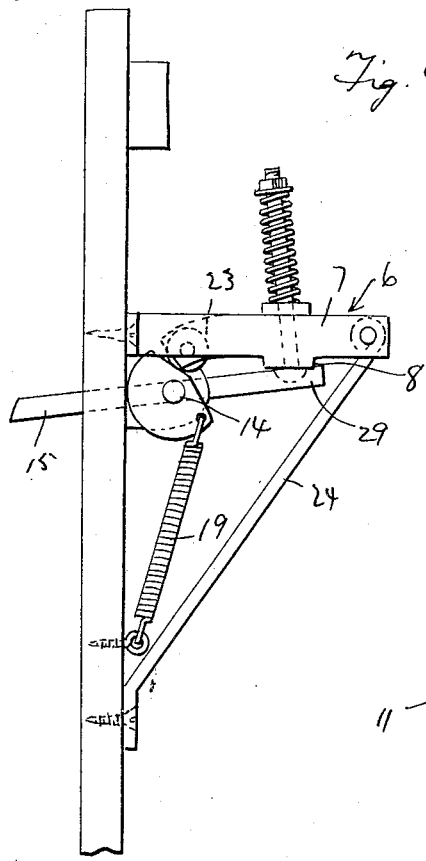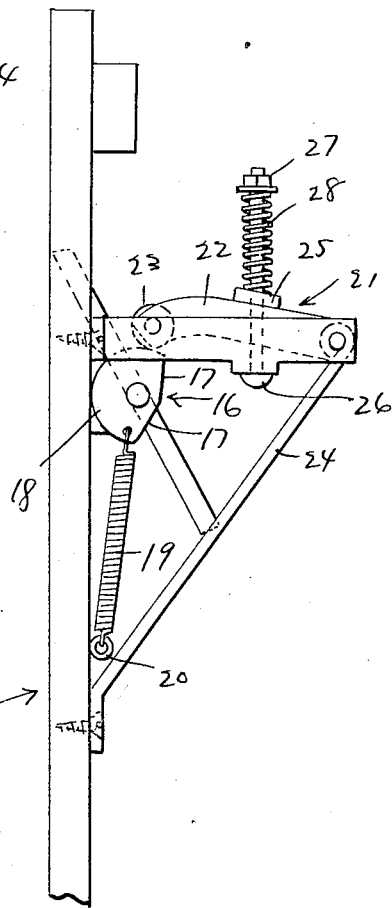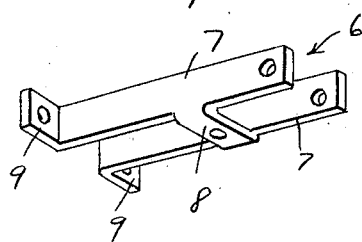

Patented Sept. 3, 1929.

1,726,935

UNITED STATES PATENT OFFICE.

EDGAR ERIC TATE, OF EDEN, TEXAS.

RETAINING DOG FOR COTTON-GIN PRESSES.

Application filed April 9, 1928. Serial No. 268,743.

This invention relates to an improved retaining dog structure for use in association with the press chamber of a cotton gin press, having more particular reference to a structure of this kind wherein the dogs are automatically pushed up and released when a predetermined force or pressure is brought to bear against them by the cotton beneath.

Briefly described, the invention comprises a rock shaft carrying a plurality of rigid dogs extending through openings in the side wall of the press and into the cotton chamber, this rock shaft being journaled for oscillation in bearings, and being equipped with a latch actuating cam.

My principal aim is to generally improve upon structures of this class by providing one which embodies an arrangement of parts associated to render the structure exceptionally practical and capable of fulfilling the requirements of a device of this class.

The particular details and their relative arrangement and association will become more readily apparent from the following description and drawings.

In the drawings:—

Figure 3 is an end view of Figures 1 and 2 looking in the direction from left to right, and showing the dogs in the normal down or horizontal position.

Figure 4 is a view like Figure 3 showing the dogs moved upwardly to release position.

Figure 5 is a detail perspective view of an attaching bracket.

Figure 1:
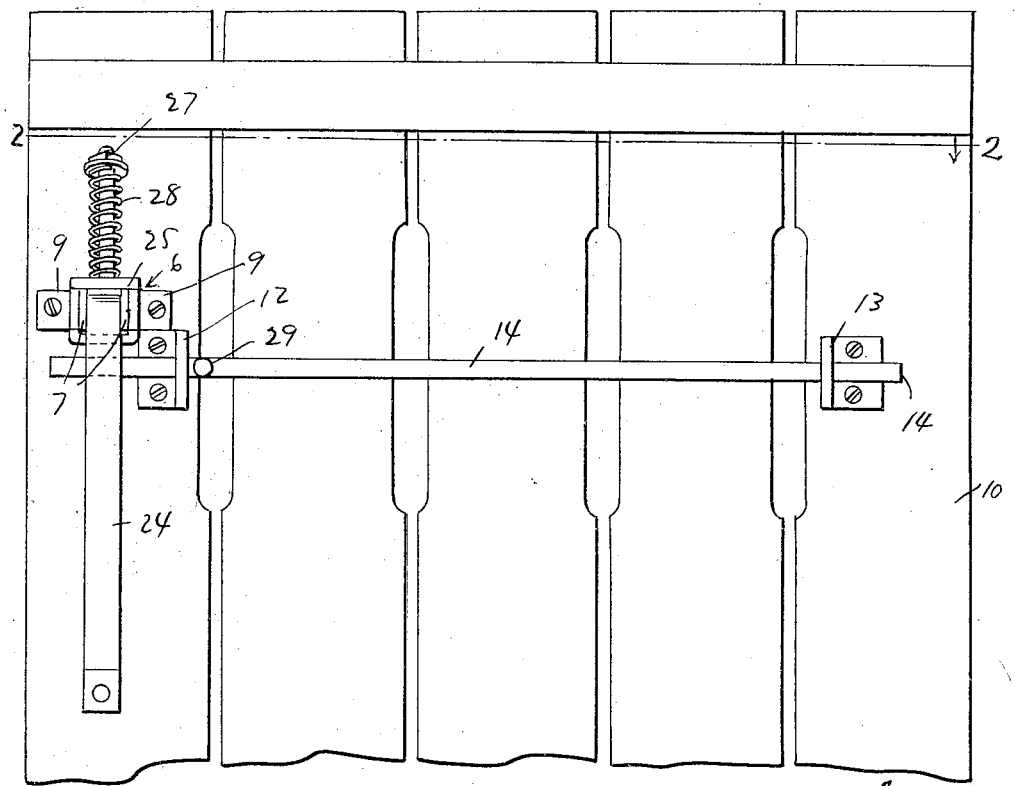
Figure 1 is an elevational view of one of the side walls or swinging door of a cotton gin press showing the improved retaining dog structure mounted thereon.
Figure 2:
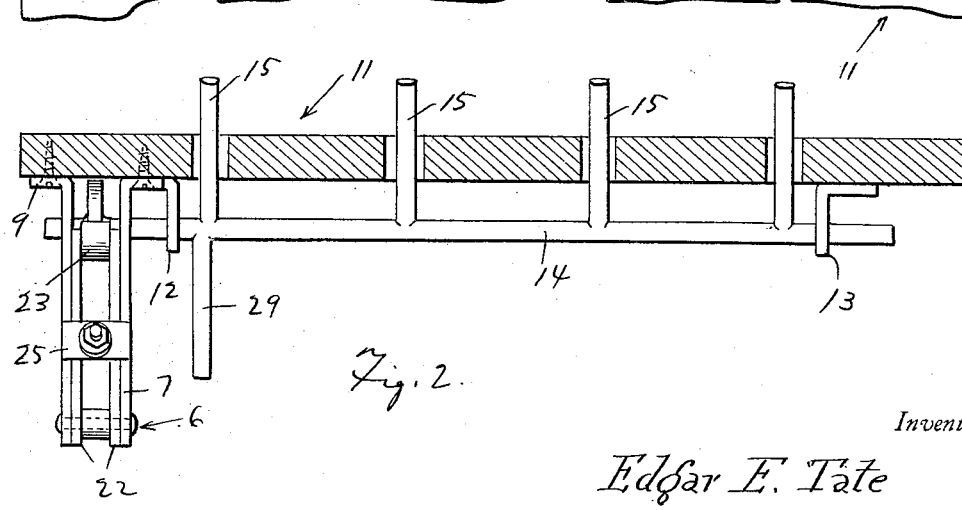
Figure 2 is a horizontal section taken approximately upon the plane of the line 2—2 of Figure 1.

Referring now to the drawings by numerals, it will be seen that the attaching bracket 6 includes spaced parallel portions 7 having a tie connection 8 on the bottom, and the inner ends being bent at right angles and apertured as at 9 to permit them to be fastened to one of the boards 10 of the side wall of the baling press 11. Incidentally the wall 11 is formed with the customary openings as represented.

The bracket includes an outstanding lug forming a bearing 12. There is a complemental bearing bracket 13 located at a distant point, and the rock shaft 14 is journaled in the bearing brackets and carries a multiplicity of fingers 15 or dogs which extend through the slots in the wall 11 to cooperate with the cotton in the baling chamber.

As shown in Figures 3 and 4 the rock shaft is provided at one end with an especially designed cam 16 having straight edge portions 17, and a curved edge portion 18.

A coil spring 19 is connected to this cam and anchored at 20 on the wall 11. Pivotally mounted on the bracket 6 is a latch 21 having spaced arm portions 22 provided with an anti-friction roller 23 at their inner ends. This roller cooperates with the cam 16 as is obvious. The opposite end portions of the arms are swingably mounted between the arms 7 of the bracket 6 where they cooperate with the diagonal brace 24.

On the intermediate portion of the latch arms is a cross piece 25 which cooperates with the aforesaid tie piece 8. In fact, a bolt 26 passes up through this tie 8 and then through the cross piece 25, having a retaining nut 27 on its upper end.

A coil spring 28 surrounds the bolt and bears at its bottom against the cross piece and serves to exert a downward yielding pressure upon the roller equipped latch and holding it firmly down upon the retaining cam as shown in Figure 3 and under normal conditions.

Referring again to the rock shaft it will be seen that this is provided with an outstanding handle 29 which may be actuated in the customary way.

In operation the retaining dogs 15 are in substantially horizontally arranged position which is the normal starting position seen in Figure 3. Of course when the dogs are in this position the cooperation of the latch roller with the cam permits relative freedom of movement of the dogs in the downward direction. In fact they are simply resisted in this movement by the tension of the spring 19. As the cotton is fed into the baling chamber the dogs may be depressed, returning to normal position again as the pressure from the cotton is released therefrom. The dogs may also be depressed downwardly by the movement of the plunger. The retaining dogs may be moved upwardly by the action of the cotton as the pressure increases in the baling chamber, and they may be moved upwardly by the action of the plunger as they are held against this upward movement by the cooperation of the spring pressed latch and roller cooperating with the retaining cam.

When completely released the cam takes the position shown in Figure 4 at which time the latch and its roller is as represented.

To return the parts to normal position it is simply necessary to grasp the handle 29 and to lift upwardly, whereupon the roller will ride down on the straight edges 17 of the cam in the same position previously assumed in Figure 3.

A careful consideration of the description in connection with the drawings will enable persons skilled in the art to which the invention relates to obtain a clear understanding of the arrangement, operation, and advantages. Therefore, a more lengthy description is regarded unnecessary.

Having thus described the invention, what I claim as new and desire to secure by Letters Patent is:—

1. In a structure of the class described, a pair of bearing brackets, a shaft mounted for rotation in said bearing brackets, said shaft being provided with integral cotton engaging dogs, a retaining element carried by said shaft, and a spring pressed retaining roller cooperable with said element, said element being such in construction as to resist the upward movement of the dogs and to allow freedom of downward movement.

2. In a structure of the class described, a pair of bearings, a rock shaft mounted for rotation in said bearings, a cam carried by said rock shaft, a plurality of cotton engaging fingers carried by said rock shaft, and a spring pressed latch cooperable with said cam for resisting upward movement of the dogs and allowing free downward movement thereof.

3. In a structure of the class described, a pair of bearings, a rock shaft mounted for rotation in the bearings, a plurality of individual dogs on the rock shaft, a segmental cam carried by the rock shaft, a bracket for disposition adjacent said cam, a latch pivotally mounted on the bracket and including a roller cooperable with the cam, and spring pressure means cooperable with the latch on said bracket.

4. In a structure of the class described, a pair of bearings, a rock shaft mounted for rotation in the bearings, a plurality of dogs carried by the rock shaft, a segmental cam on one end of the rock shaft, a coil spring connected to said cam and adapted to be anchored upon a rigid support, a bracket adapted to be fastened upon the support above the cam, a latch pivotally mounted on the bracket and embodying an anti-friction roller engageable with the cam, and a pressure spring connected with the bracket and latch.

In testimony whereof I affix my signature.

EDGAR ERIC TATE.